Dec. 13, 1955  D. McANDREWS  2,726,714
INFANT RESTRAINING MEANS FOR AUTOMOBILE USE
Filed Aug. 13, 1953
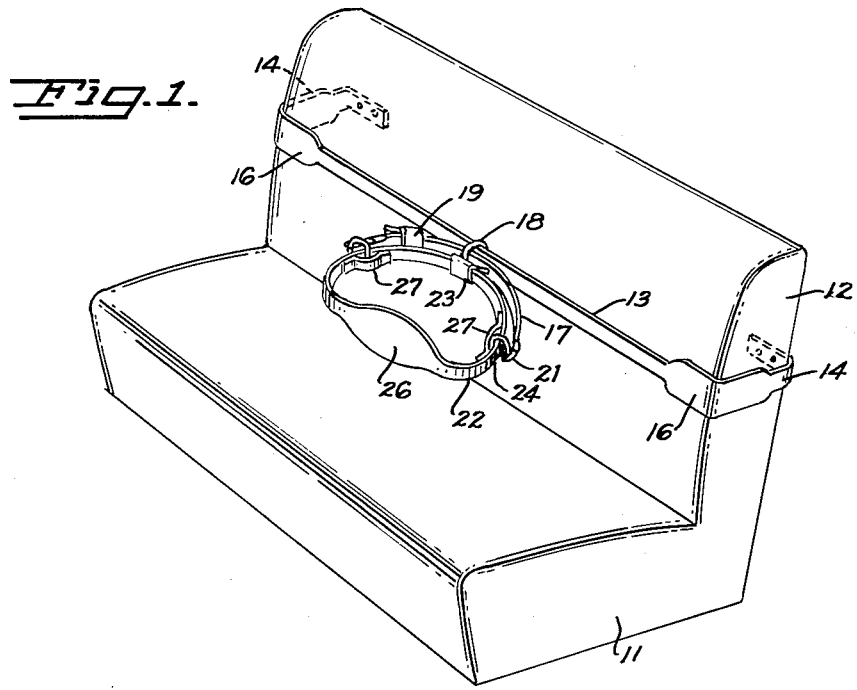
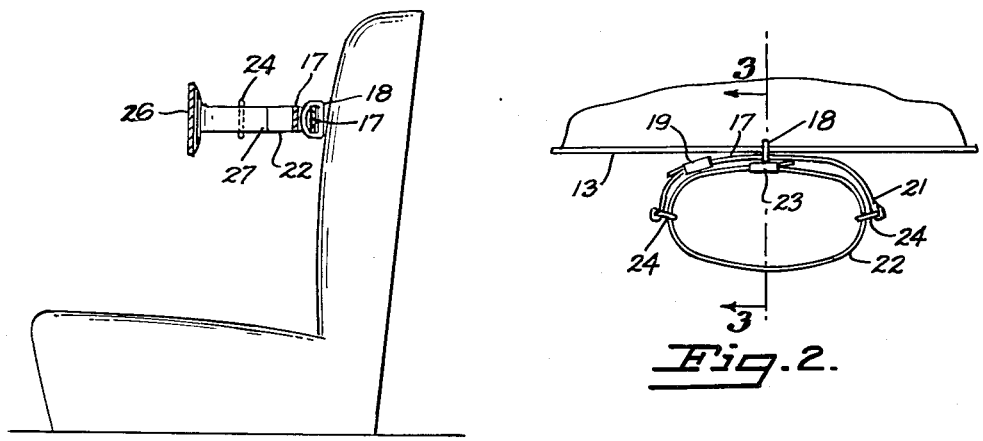
INVENTOR.
DONALD McANDREWS
BY
Townsend, Townsend and Hoppe
ATTORNEYS

United States Patent Office 2,726,714
Patented Dec. 13, 1955

2,726,714
INFANT RESTRAINING MEANS FOR AUTOMOBILE USE

Donald McAndrews, San Jose, Calif.

Application August 13, 1953, Serial No. 373,961

3 Claims. (Cl. 155—189)

This invention relates to a new and useful improvement in safety straps for infants for use in automobiles.

The present invention comprises a strap which fits around the back of an automobile seat and a belt mounted on said strap, the belt being adjustable to fit around the abdomen of an infant. When in use, the device prevents injury to an infant which might otherwise be occasioned by a sudden change in velocity or turning movement of the automobile. Thus, an infant may sit or stand on an automobile seat without danger of injury and the driver of the vehicle is relieved of the necessity of constant attention to the infant in order to prevent danger of falling.

The invention is easily installed and does not interfere with normal use of the vehicle when no infant is occupying the same. In addition, the device is easily adjusted to fit infants of different sizes. Further, adjustment is provided to increase or decrease the latitude of movement afforded.

The device is so constructed that the infant is provided considerable movement along the seat and also is permitted turning and twisting movements which are normal to children but at the same time the latitude of such movement may be adjusted to fit the needs of the child or the particular moment.

In the drawings:

Fig. 1 is a perspective of the device as installed on an automobile seat.

Fig. 2 is a top plan of the device.

Fig. 3 is a vertical mid-section taken substantially along the line 3—3 of Fig. 2.

In the accompanying drawings, the device which is the subject of this invention is shown installed on a conventional automobile seat consisting of a seat cushion 11 and a back cushion 12. The strap 13 is flat so that when a passenger leans against it no discomfort is occasioned. The strap 13 may fit entirely around the back cushion 12 or it may be formed of resilient material and be provided with a pair of hooks 14 which fit around the back of the back rest. Preferably, each end of the front part of the strap is enlarged as indicated by reference numeral 16 in order to prevent the infant from falling off the seat when the door is opened, as hereinafter appears.

An adjustable harness 17 is connected to the strap 13 by means of a D-shaped ring 18 which slides along the center part of the strap 13. This permits the infant to move lengthwise of the seat but by reason of the enlarged portions 16 at each end of the strap the infant cannot approach the end of the seat and hence cannot fall off the end of the seat when the door is opened. Harness 17 is adjusted by means of a buckle 19 and each end thereof terminates in a spring snap fastener 21.

A body belt 22 is provided to fit around the abdomen of the infant. This body belt is adjustable by means of a buckle 23 to accommodate different sizes of infants. The body belt 22 is provided with a pair of rings 24 at each side which are engaged by the spring snap fasteners 21 so that the infant may be quickly removed from the harness 17 when desired.

To support the abdomen of the child the body belt 22 is formed with an enlarged portion 26 at the front center and the enlarged portion may be provided with a conventionally suitable rigid interliner (not shown) such as foam rubber to maintain the enlarged form thereof. As shown particularly in Fig. 1, the ring 24 at each side of the body belt may be retained in a loop 27 sewed to the inner side of the belt 22, the loop being padded so that the D-ring 24 does not cause discomfort when it presses against the body of the infant.

In use, the strap 13 may be quickly and conveniently, either temporarily or permanently, installed around the back of the back rest 12 of the vehicle seat. If permanently attached, by reason of the fact that it is flexible and lies against the back rest, no discomfort is caused when a passenger leans against it. D-ring 18 is fastened around strap 13 and may move longitudinally with respect thereto. Harness 17 passes through D-ring 18 and may be adjusted by means of buckle 19 or other adjustable means so as to increase or decrease the latitude of movement permitted the infant. Body belt 22 passes around the abdomen of the infant under the arms and may be adjusted by means of buckle 23 or other adjustable fastening means to accommodate the size of the infant. Rings 24 carried at either side of body belt 22 are engaged by spring snap fasteners 21 on the ends of harness 17. When the device is in position on the body of the infant the enlarged abdomen support 26 at the front provides secure and comfortable support. When in place, the child may sit or stand and is able to move the full width of the seat.

It will be understood that the device may be installed on either the front or the back seat of the vehicle. In addition, it will be understood that by employing several harnesses 17 and belts 22, several children may be accommodated with a single seat restraining strap 13.

Although I have described my invention in some detail by way of illustration and example for purposes of clarity of understanding, it is understood that certain changes and modifications may be practiced within the spirit of the invention and scope of the appended claims.

What is claimed is:

1. An infant restraining device comprising a flat, elongated seat strap arranged to extend along the back rest of a vehicle seat, a relatively short harness strap, means slidably attaching said harness strap to said seat strap for movement of said harness strap and means substantially the entire length of said seat strap, a belt arranged to pass around the abdomen of an infant and means detachably connecting each end of said harness strap to said belt adjacent each side of the infant.

2. A device according to claim 1 in which said seat strap is of enlarged width adjacent each end of said seat.

3. An infant restraining device comprising an elongated flat strap extending along the back rest of a vehicle seat, said strap being of increased width adjacent each end of said seat, a harness strap, means for adjusting the length of said harness strap, a ring passing around said harness and said strap and permitting movement of said strap and ring between the portions of increased width of said strap, a belt arranged to pass around the body of an infant, means for adjusting the length of said belt, a pair of second rings attached to said belt at opposite sides of the body of the wearer and fastening means on opposite ends of said harness strap arranged to engage said second rings.

References Cited in the file of this patent

UNITED STATES PATENTS

| | | |
|---|---|---|
| 548,076 | Mack | Oct. 15, 1895 |
| 1,636,459 | Chappel | July 19, 1927 |
| 1,712,198 | Clapp | May 7, 1929 |
| 2,308,466 | Johnson | Jan. 12, 1943 |
| 2,613,953 | Giovannoni | Oct. 14, 1952 |
| 2,695,052 | Yates et al. | Nov. 23, 1954 |

FOREIGN PATENTS

| | | |
|---|---|---|
| 128,138 | Great Britain | June 19, 1919 |
| 515,818 | Great Britain | Dec. 14, 1939 |